United States Patent
Kakinuma (10) Patent No.: US 7,487,855 B2
(45) Date of Patent: Feb. 10, 2009

(54) ENGINE CONTROL METHOD AND APPARATUS INCLUDING A TILT ANGLE SENSOR

(75) Inventor: Hiroyuki Kakinuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 506 days.

(21) Appl. No.: 11/220,858

(22) Filed: Sep. 7, 2005

(65) Prior Publication Data

US 2006/0054375 A1 Mar. 16, 2006

(30) Foreign Application Priority Data

Sep. 13, 2004 (JP) .............................. 2004-265229

(51) Int. Cl.
*B60K 28/14* (2006.01)
(52) U.S. Cl. ...................................... 180/283
(58) Field of Classification Search ................ 180/283, 180/282, 284, 277, 279
See application file for complete search history.

(56) References Cited

U.S. PATENT DOCUMENTS

| | | | | |
|---|---|---|---|---|
| 3,034,097 A | * | 5/1962 | English et al. | .............. 340/440 |
| 3,915,255 A | * | 10/1975 | Springer | ..................... 180/282 |
| 5,033,428 A | | 7/1991 | Sasaki | |
| 5,613,571 A | * | 3/1997 | Rank et al. | .................. 180/282 |
| 6,527,077 B2 | * | 3/2003 | Yamamoto et al. | .......... 180/283 |
| 6,735,512 B2 | * | 5/2004 | Yamazaki et al. | ............ 701/102 |
| 6,941,206 B2 | * | 9/2005 | Hasegawa et al. | .............. 701/38 |
| 7,124,016 B2 | * | 10/2006 | Kakinuma | ................... 701/112 |
| 2002/0027037 A1 | * | 3/2002 | Yamamoto et al. | .......... 180/283 |
| 2004/0025839 A1 | | 2/2004 | Kashibata et al. | |
| 2004/0050609 A1 | | 3/2004 | Machida et al. | |
| 2005/0208847 A1 | * | 9/2005 | French et al. | .............. 440/88 L |
| 2006/0169254 A1 | * | 8/2006 | Wells et al. | .................. 123/491 |
| 2006/0218808 A1 | * | 10/2006 | Tsuruta et al. | ................. 33/335 |

FOREIGN PATENT DOCUMENTS

| | | |
|---|---|---|
| EP | 0408033 | 1/1991 |
| EP | 1184233 | 3/2002 |
| JP | 08-135491 | 5/1996 |
| JP | 9-065811 | 3/1997 |

\* cited by examiner

*Primary Examiner*—Paul N. Dickson
*Assistant Examiner*—Drew J. Brown
(74) *Attorney, Agent, or Firm*—Carrier, Blackman & Associates, P.C.; William D. Blackman; Joseph P. Carrier (57) ABSTRACT

An engine controller for a vehicle is provided, the engine controller having a tilt angle sensor incorporated therein. The tilt angle sensor is operatively connected to an electronic control unit via a signal line. The electronic control unit is operable to temporarily interrupt the operations of a fuel injector and/or an ignition coil when a tilt angle signal is input via the signal line when the tilt angle signal indicates a tilt angle in excess of a predetermined value. As a result of this configuration, the number of required parts is reduced and available space on the vehicle is used effectively.

13 Claims, 4 Drawing Sheets

ENGINE CONTROL METHOD AND APPARATUS INCLUDING A TILT ANGLE SENSOR

CROSS-REFERENCE TO RELATED APPLICATIONS

The present invention claims priority under 35 USC 119 based on Japanese patent application No. 2004-265229, filed on Sep. 13, 2004. The subject matter of this priority document is incorporated by reference herein.

BACKGROUND OF THE INVENTION

1. Field of the Invention

The present invention relates to an engine control method and apparatus for a vehicle, and more particularly, to an engine control method and apparatus for a motorcycle, which is equipped with a tilt angle sensor.

2. Background Art

It is well known to provide an engine which includes a fuel injector, for a motorcycle and other vehicles. A vehicle has been proposed that is provided with a tilt angle sensor to detect the tipping of the vehicle, and is capable of stopping an engine when the vehicle tilts from an upright orientation by a prescribed tilt angle or more. The proposed vehicle is provided with a starter kill relay between a battery and a fuel injector and an ignition coil (an engine drive section), and also a fuel pump relay between the battery and a fuel pump; and operates those relays based a tilt angle signal from a tilt angle sensor. Such a configuration is disclosed, for example, in JP-A No. 135491/1996.

In such a conventional configuration however, both a starter kill relay to cut off electric power supply to an engine drive section and a fuel pump relay to cut off electric power supply to a fuel pump are required. As a result, the required number of parts is increased, and additional installation space is required for the relay switches. Consequently, when such a configuration is applied to a compact vehicle such as an off-road vehicle for example, it may be difficult to effectively use the available space in an existing component layout.

In view of the above situation, the object of the present invention is to provide a vehicle's engine controller having a tilt angle sensor. This configuration solves the aforementioned problems of the prior art, and is capable of reducing the number of required parts such as electric parts and the like and thus effectively using the available space for the installation.

SUMMARY OF THE INVENTION

In order to solve the above problems, a first aspect of the invention is characterized in that an engine controller is provided with an engine drive section to drive an engine supported by a vehicle body, a control section to control the engine drive section, and a tilt angle sensor, operatively connected to the control section. The tilt angle sensor is used to detect the extent of tilting of the vehicle body relative to a vertical or upright orientation, and outputs a signal corresponding to a current tilt angle. The control section acts to stop driving the engine drive section when a prescribed tilt angle signal is input from the tilt angle sensor.

A second aspect of the invention is characterized in that, in addition to the configuration of the first aspect of the invention, the engine controller is provided with an electric power supply, and the output line of the electric power supply is operatively connected to the engine drive section, the control section and the tilt angle sensor.

A third aspect of the invention is characterized in that, in addition to the configuration of the first or second aspects of the invention, the electric power supply contains an electric generator to generate electric power by the rotation of the engine.

Further, a fourth aspect of the invention is characterized in that, in addition to the configuration of any one of the first to third aspects of the invention, the engine drive section comprises a fuel injector and/or an ignition coil.

Still further, a fifth aspect of the invention is characterized in that, in addition to the configuration of the fourth aspect of the invention, the engine controller is provided with a fuel pump to feed fuel to the fuel injector. The fuel pump is operatively connected to the output line of the electric power supply.

According to the first aspect of the invention, an engine controller is provided with a control section to control an engine drive section, and is further provided with a tilt angle sensor, operatively directly connected to the control section. Since the control section serves to stop driving the engine drive section when a prescribed tilt angle signal is input from the tilt angle sensor, it is possible to stop driving the engine drive section when a vehicle body tilts beyond a specified angle, even without a starter kill relay to cut off the electric power supply to the engine drive section and thus to reduce the number of parts. By reducing the required number of parts, it becomes possible to efficiently install various electric parts in the available space of an existing layout even in the case of a compact vehicle and thus to effectively use the available space for the installation.

According to the second aspect of the invention, the engine controller is provided with an electric power supply, and the output line of the electric power supply is operatively connected to the engine drive section, the control section and the tilt angle sensor. As a result, it is possible to stop driving the engine drive section without the aforementioned starter kill relay when a vehicle, having the electric power supply, tilts beyond a specified tilt angle, thus reducing the required number of parts, and permitting the effective use of the available space of the vehicle for the installation.

Further, according to the third aspect of the invention, the electric power supply contains an electric generator to generate electric power by the rotation of the engine. As a result, it is possible to apply the invention also to a so-called battery-less vehicle.

According to the fourth aspect of the invention, the engine drive section comprises a fuel injector and/or an ignition coil. As a result, it is possible to stop driving the engine drive section without the aforementioned starter kill relay when a vehicle having an engine of a fuel injection type tilts beyond a specified tilt angle, thus reducing the number of required parts, and effectively using the available space of the vehicle for the installation.

According to the fifth aspect of the invention, the engine controller is provided with a fuel pump to feed fuel to the fuel injector, and the fuel pump is operatively connected to the output line of the electric power supply. As a result, it is possible to eliminate the use of not only the aforementioned starter kill relay, but also a fuel pump relay to cut off the electric power supply to the fuel pump. Thus, the required number of parts is still further reduced.

For a more complete understanding of the present invention, the reader is referred to the following detailed description section, which should be read in conjunction with the accompanying drawings. Throughout the following drawings and description, like numbers refer to like parts. The above-mentioned object, other objects, characteristics and advantages of the present invention will become apparent form the detailed description of the embodiment of the invention presented below in conjunction with the attached drawings.

DETAILED DESCRIPTION OF THE ILLUSTRATIVE EMBODIMENT

A selected illustrative embodiment according to the present invention is explained herein, with reference to the attached drawings. It should be understood that only structures considered necessary for clarifying the present invention are described herein. Other conventional structures, and those of ancillary and auxiliary components of the system, are assumed to be known and understood by those skilled in the art.

Figure 1:
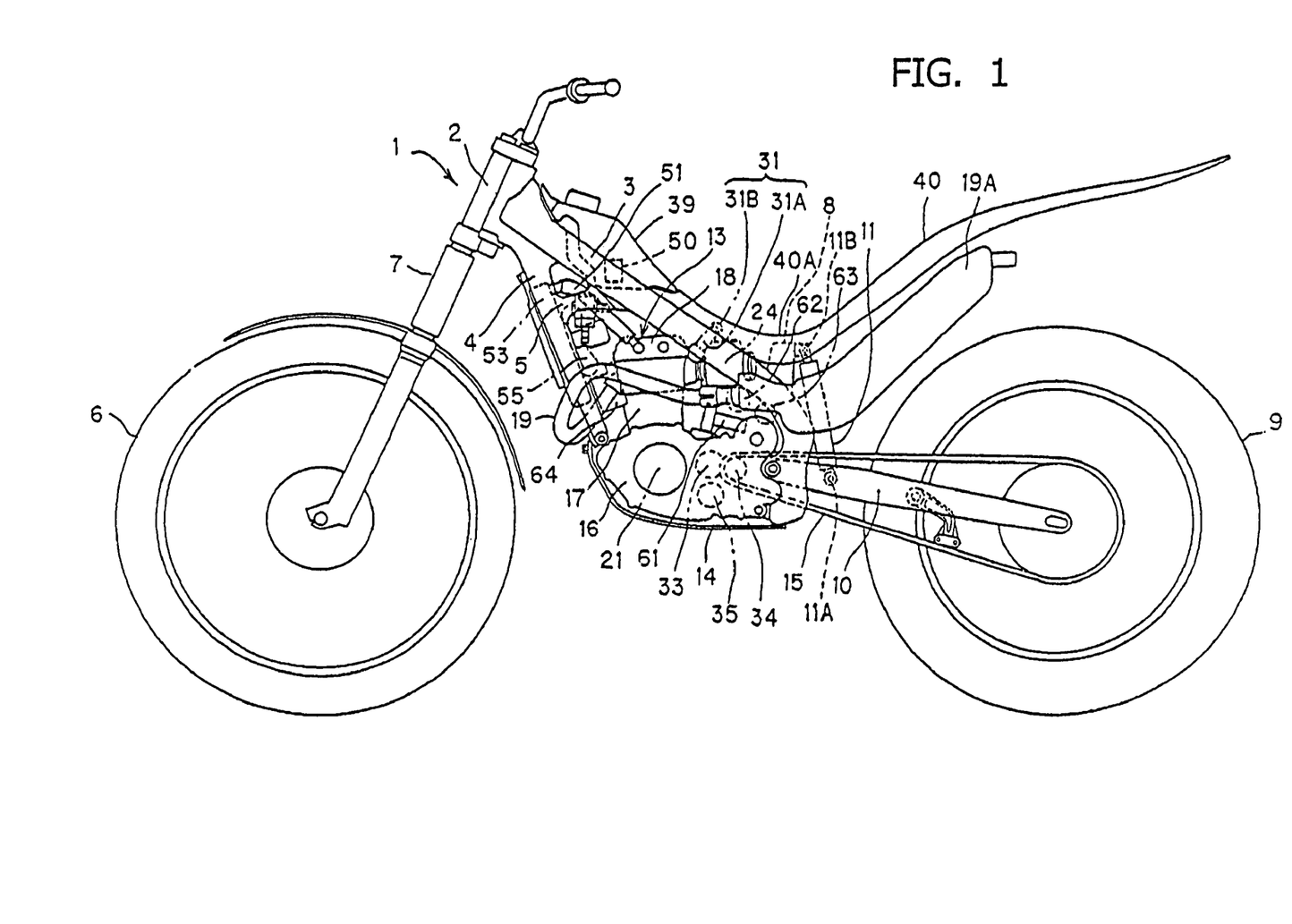
FIG. 1 is a side view of a motorcycle illustrating an embodiment of the present invention, showing an engine mounted on the vehicle frame such that a fuel injector attached to a cylinder head thereof overlaps with the main frames of the vehicle as viewed from the side.

FIG. 1 is a side view of a motorcycle illustrating the illustrative embodiment of the present invention. The motorcycle of FIG. 1 is a trail vehicle, designed to be usable for off-road traveling in the back country or wilderness. The motorcycle is equipped with a body frame 1. The body frame 1 is configured so as to be provided with: a head pipe 2 disposed at the front end thereof, and a pair of main frames 3 extending from the head pipe 2 toward the rear of the vehicle body while inclining downward separately from each other in the width direction of the vehicle body. The body frame 1 also includes a pair of down tubes 4 extending below the main frames 3 at an angle larger than that of the main frames 3 while likewise inclining downward separately from each other in the width direction of the vehicle body, and connectors 5 extending between the main frames 3 and the down tubes 4.

A front fork 7 supporting a front wheel 6 is steerably connected to the head pipe 2, and a rear fork 10 supporting a rear wheel 9 is pivotally connected to the respective lower ends of the main frames 3. The lower end 11A of a rear shock absorber 11 is connected to the rear fork 10, and the upper end 11B of the rear shock absorber 11 is connected to a rear shock absorber mount 8, fixed to the main frames 3.

A fuel tank 39 is mounted between the upper halves of the main frames 3, and a fuel pump 50 is attached to the fuel tank 39. Further, a vehicle body cover 40, the center portion 40A of which thereof is lowered in the anterior-posterior direction, is disposed above the lower halves of the main frames 3 in a manner of continuing from the fuel tank 39.

Figure 2:
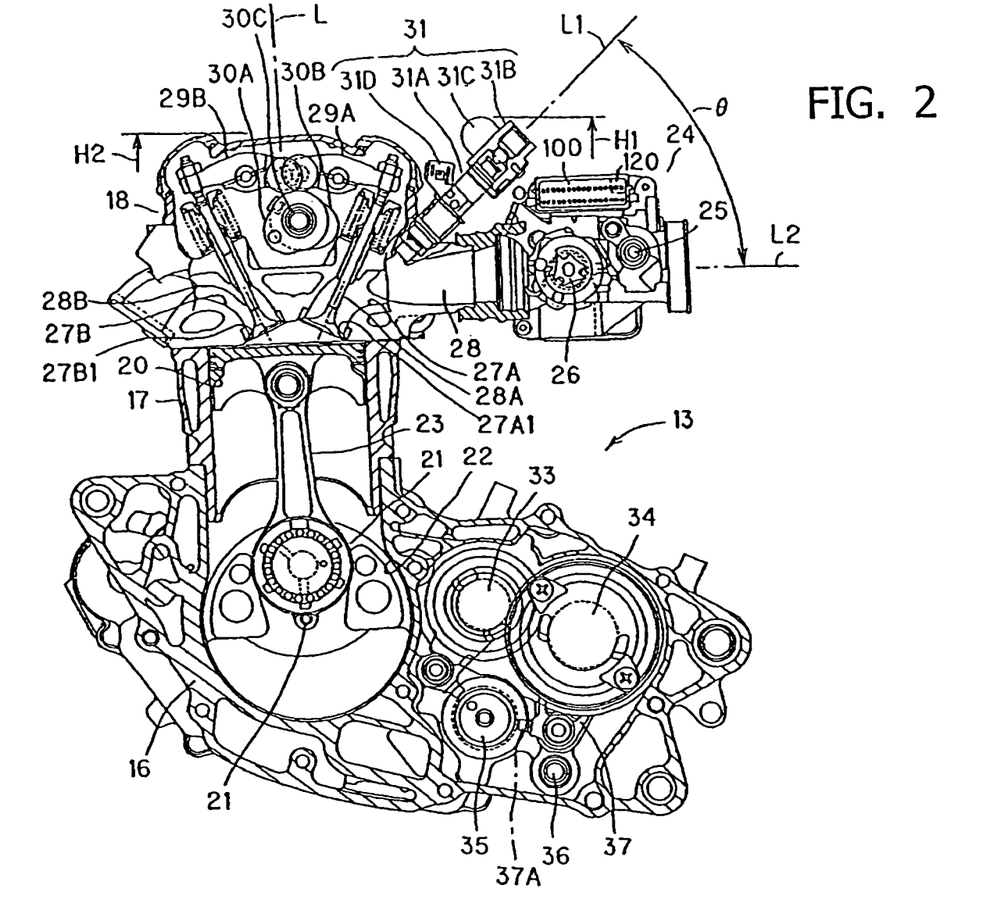
FIG. 2 is a sectional view of the engine of FIG. 1, showing the electronic control unit, including a tilt angle sensor, mounted to an upper side of the throttle body.

As shown in FIGS. 1-2, a single-cylinder four-cycle engine 13 is attached to the frame 1, through plural brackets extending between the main frames 3 and the down tubes 4, so as to be adjacent to the sloping portion of the body frame 1 (the main frames 3) and the lower surface of the engine 13. In other words, as shown in FIGS. 1 and 2, vehicle body main frames are disposed to the upper left and the upper right of the engine, respectively. The engine 13 is covered from below with an engine guard 14. The power of the engine 13 is transmitted to the rear wheel 9 via a chain transmission device 15. The engine 13 is provided with an engine block 16, a cylinder 17 and a cylinder head 18. An exhaust pipe 19 is connected to the front side of the cylinder head 18. The exhaust pipe 19 extends toward the rear of the vehicle body through the left side of the engine 13 and is connected to a muffler 19A.

FIG. 2 is a sectional view of the engine 13. A piston 20 is slidably disposed in the cylinder 17. The piston 20 is connected to a crank shaft 21 via a connecting rod 23, and the crank shaft 21 is pivotally supported by a crank case 22.

The cylinder head 18 is provided with an intake path 27A and an exhaust path 27B. The paths are provided with an intake valve 28A and an exhaust valve 28B respectively, and the valves are configured so as to be able to open and close an intake port 27A1 and an exhaust port 27B1 respectively. The intake valve 28A moves upward and downward through a rocker arm 29A in accordance with the profile of a cam 30A and can open and close the intake port 27A1. Likewise, the exhaust valve 28B moves upward and downward through a rocker arm 29B in accordance with the profile of a cam 30B and can open and close the exhaust port 27B1. The cams 30A and 30B are mounted on a camshaft 30C. The camshaft 30C is connected to the crank shaft 21 via a chain power train (not shown in the figure), rotates in accordance with the rotation of the crank shaft 21, and opens the intake and exhaust ports at the appropriate times.

A throttle body 24 is connected to the rear side of the cylinder head 18 in a direction nearly perpendicular to the axis line L of the cylinder 17, and combustion air cleaned through an air cleaner not shown in the figure is supplied to the throttle body 24.

The throttle body 24 is provided with an idling adjusting screw 25 and a throttle valve 26. The idle is adjusted as follows: by turning the screw 25 to the right, the opening of the throttle valve 26 increases, the amount of supplied air increases, and the number of engine revolutions also increases for a given time; and, by turning the screw 25 to the left, the opening of the throttle valve 26 decreases, the amount of supplied air decreases, and the number of engine revolutions for a given time is also lower.

The intake path 27A in the cylinder head 18 is located downstream of the throttle valve 26, and an injector (fuel injector) 31 is disposed at the intake path 27A.

The injector 31 is attached to the cylinder head 18 so that the axis line L1 of the injector 31 forms a prescribed angle (acute angle) θ with the axis line L2 of the throttle body 24. Further, the injector 31 is disposed so that almost the entire body 31A (FIG. 1) overlaps with the main frames 3 in the vertical direction of the motorcycle body (that is, as seen from the side of the vehicle). Specifically, as shown in FIGS. 1 and 2, the cylinder head 18, a fuel injector 31, a throttle body 24 of the engine, the control section and the tilt angle sensor 120 are disposed adjacent to each other beneath the main frames 3 at a central portion of the vehicle body. Moreover the injector 31 is disposed so that the cap portion 31B (FIG. 1) thereof protrudes upward from the main frames 3 and comes close to the bottom surface of the vehicle body cover 40.

Furthermore, the injector 31 is provided with a connecting port 31C for a fuel tube, the fuel pump 50 (refer to FIG. 1) attached to the fuel tank 39 is connected to the connecting port 31C, and fuel is supplied to the injector 31 through the fuel pump 50.

An electronic control unit (hereunder referred to as "ECU") 100 is attached to the throttle body 24, and a tilt angle sensor 120 (FIGS. 2, 4) is incorporated into the ECU 100, to detect a tilt angle of the vehicle body in a left or right direction, relative to an upright orientation of the vehicle body. The tilt angle sensor 120 adopted for use is, for example, an angle sensor provided in a case with a weight suspended swingably and a detection switch to detect the location of the weight when the tilt angle in a left or right direction of a vehicle body reaches a prescribed angle (not shown in the figures).

The tilt angle sensor 120 is connected to the control board of the ECU 100 (hereunder referred to simply as "ECU 100") via a line L30 (FIG. 4), and outputs a tilt angle signal SK to the ECU 100 via the line L30.

Figure 3:
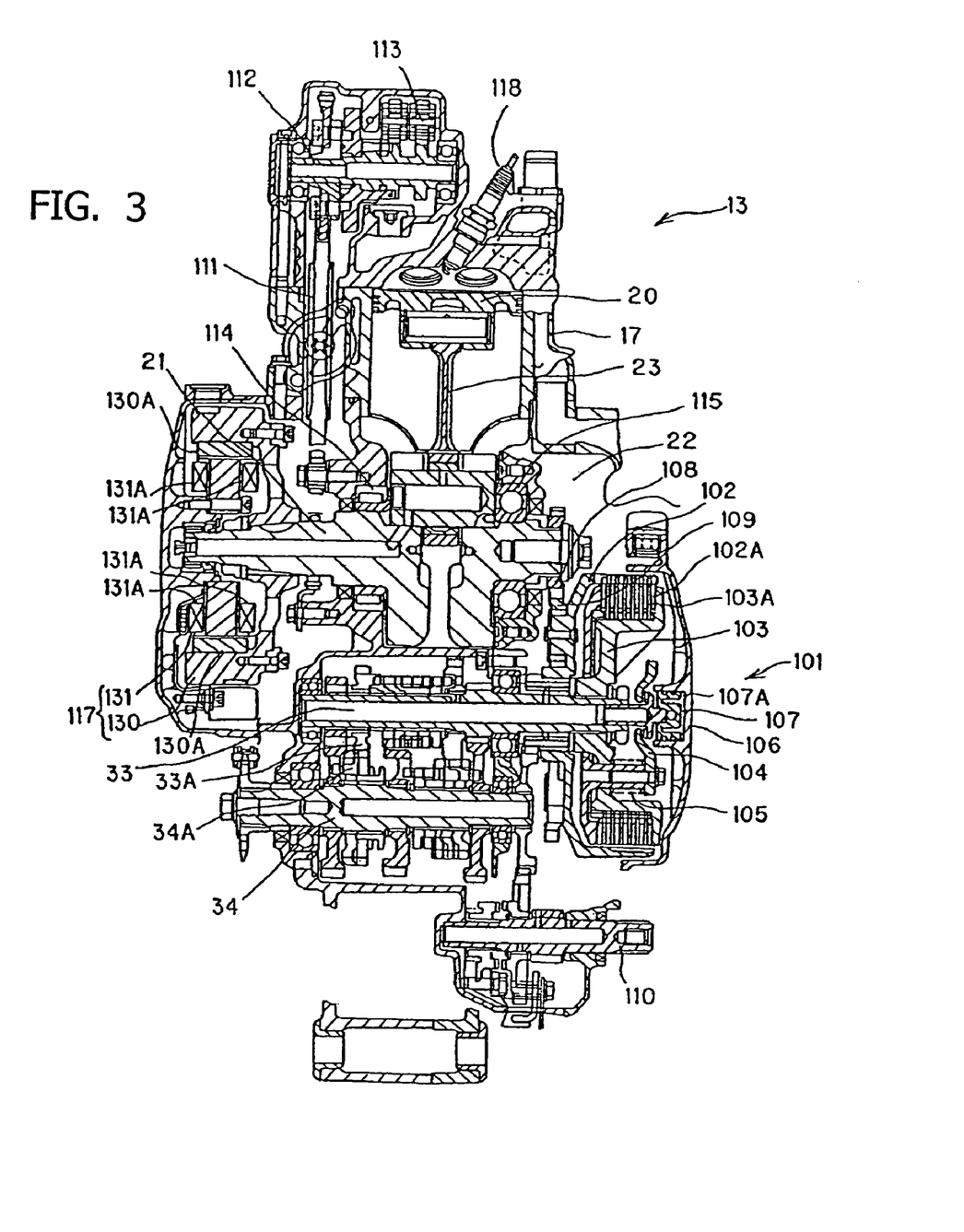
FIG. 3 is another sectional view of the engine of FIG. 1 transverse to the section of FIG. 2, showing an alternator (generator) mounted to one end of the crankshaft of the engine.

As shown in FIGS. 2 and 3, in the engine 13, in addition to the crank shaft 21, a main shaft 33, a counter shaft 34, a shift drum 35, a shift spindle 36 and shift forks 37 are supported on the crank case 22, and thereby a gear transmission of a constant mesh type is formed. Here, the torque of the crank shaft 21 is transmitted or disconnected to the main shaft 33 through a multiple-disc clutch 101 of a friction type shown in FIG. 3.

The crank shaft 21 is supported from both sides thereof by a roller bearing 114 and a radial ball bearing 115.

The multiple-disc clutch 101 is disposed coaxially with the main shaft 33 and provided with: a clutch outer 102 having clutch discs 102A; a clutch center 103 having clutch plates 103A; a pressure plate 104 movable in the axial direction so as to push the clutch plates 103A against the clutch discs 102A for clutch connection; plural clutch springs 105 to enforce the pressure plate 104 for the clutch connection; and a clutch release mechanism 106 to move the pressure plate 104 toward the direction where the clutch connection is released.

The clutch release mechanism 106 is provided with a release cylinder 107 and a space 107A filled with oil inside the release cylinder 107. The space 107A is connected to an oil cylinder connected to a clutch lever (not shown in the figures). Also shown in FIG. 3, the engine 13 includes a kick shaft 110, a cam chain 111, a cam shaft 112, and a rocker shaft 113.

A gearwheel 108 is fixed to the end of the crank shaft 21 on the side of the crank shaft 21 corresponding to the multiple-disc clutch 101. The gearwheel 108 meshes with a gearwheel 109 fixed to the clutch outer 102 of the multiple-disc clutch 101. Hence, when the crank shaft 21 rotates, the clutch outer 102 also rotates on a steady basis through the gearwheels 108 and 109.

At the time of clutch connection, the pressure plate 104 is pushed toward the left direction in the figure by the pressure of the oil with which the space 107A in the release cylinder 107 is filled, the clutch center 103 is pushed also toward the left direction in the figure by the force reinforced by the clutch spring 105, and thereby the clutch plates 103A are pushed against the clutch discs 102A. In this state, the torque of the crank shaft 21 transmitted to the clutch outer 102 through the aforementioned gearwheels 108 and 109 is further transmitted to the clutch center 103 through the clutch discs 102A and the clutch plates 103A, and still further transmitted to the main shaft 33 through the clutch center 103.

At the time of the release of the clutch connection, by operating a clutch lever (not shown in the figures), the oil with which the space 107A is filled is discharged to the side of the oil cylinder connected to the clutch lever. Thereby, the pressure plate 104 moves toward the right direction in the figure, the force reinforced by the clutch springs 105 weakens, and the clutch discs 102A and the clutch plates 103A are released from the pressure contact state. When they are released, the clutch center 103 idles and torque is prevented from being transmitted to the main shaft 33.

The torque is transmitted from the crank shaft 21 to the main shaft 33, and the rotating speed of the crank shaft 21 is changed through the aforementioned gear transmission for example by shifting gears to the first-speed gear, the second-speed gear or the third-speed gear. The torque is transmitted to the counter shaft 34, to an output shaft (not shown in the figures) connected to the counter shaft 34 through a gearwheel, and then to the rear wheel 9 from the output shaft through the chain transmission device 15 as the power of the engine 13.

A change pedal (not shown in the figures) mounted on the crank case of a motorcycle is operated to permit shifting of gears to, for example, the first-speed gear, the second-speed gear or the third-speed gear.

Prior to the change pedal operation, the clutch lever (not shown in the figures) is operated and the coupling between the crank shaft 21 and the main shaft 33 is disconnected through the multiple-disc clutch 101.

The change pedal is then operated while the crank shaft 21 and the main shaft 22 are in the disconnected state. The change pedal is connected to the shift spindle 36 shown in FIG. 2. When the change pedal is operated, the shift spindle 36 rotates. Simultaneously with the operation, the shift drum 35 rotates through a gear mechanism (not shown in the figures). By the rotation, any one of the shift forks 37 slides in the axial direction through a shift pin 37A engaging the groove (not shown in the figures) of the shift drum 35, and the shifted shift fork 37 makes any one of the gearwheels 34A (FIG. 3) on the counter shaft 34 move in the axial direction and engage any one of the gearwheels 33A (FIG. 3) on the main shaft 33.

A change gear ratio is determined by the combination of the engaged gearwheels. The torque is transmitted from the crank shaft 21 to the main shaft 33. The rotating speed of the crank shaft 21 is changed in accordance with the change gear ratio, for example by shifting gears to the first-speed gear, the second-speed gear or the third-speed gear, and the torque is transmitted to the counter shaft 34, then to the output shaft (not shown in the figures) connected to the counter shaft 34 through the gearwheel, and further from the output shaft to the rear wheel 9 as the power of the engine 13 through the chain transmission device 15.

The engine 13 is a water-cooled type engine. As shown in FIG. 1, one end of each of a pair of hoses 51 is connected to the water jacket of the cylinder head 18 and the other end thereof is connected to a radiator 53 supported between the down tubes 4. A fan 55 is provided to draw air through the radiator 53. A water pump (not shown in the figures) is driven by the engine 13, and the coolant water having cooled the engine 13 at the water jacket circulates to the radiator 53, is cooled by the traveling up-wind or the wind generated by the fan 55, circulates in the water jacket, and thus cools the engine 13.

As shown in FIG. 3, an electric generator (alternator) 117 for generating alternating-current power by making use of the torque of the crank shaft 21, is connected to the left end, in the figure, of the crank shaft 21.

The alternator 117 is connected to the crank shaft 21 and configured so as to be provided with a magnet rotor 130 rotating integrally with the crank shaft 21, and a stator coil 131 attached to the crank case 22 so as to be located inside the magnet rotor 130. Permanent magnets 130A of north poles and south poles are attached alternately to the inside of the magnet rotor 130. The stator coil 131 is composed of plural coils 131A which are disposed radially.

Figure 4:
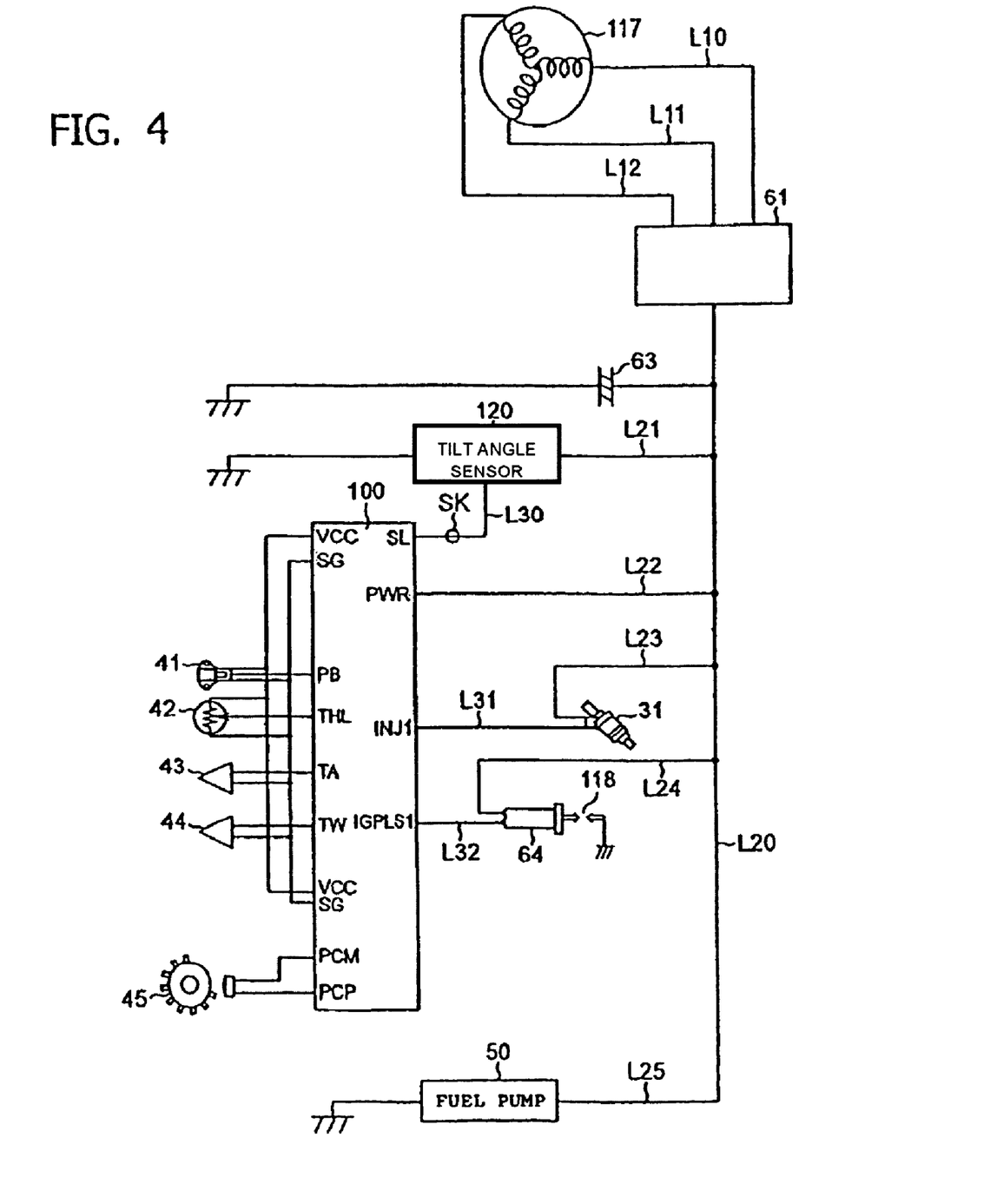
FIG. 4 is a diagram showing the electrical configuration of the motorcycle of FIG. 1.

FIG. 4 is an electric diagram of a motorcycle.

An alternator 117 is connected to a regulator 61 via output lines (electric power lines) L10, L11 and L12. The output line L20 of the regulator 61 is connected to a condenser 63 for smoothing, a tilt angle sensor 120 via a connection line L21, and further an ECU 100 via a connection line L22. Further the same output line L20 is connected to an injector 31 via a connection line L23, an ignition coil (igniter) 64 to apply voltage for ignition to a spark plug 118 via a connection line L24, and further a fuel pump 50 via a connection line L25.

When the crank shaft 21 rotates as stated above, the magnet rotor 130 composing the alternator 117 rotates, the north poles and south poles of the permanent magnets 130A attached to the inside of the magnet rotor 130 pass alternately around the outside of the stator coil 131, and thus induced current flows in the coils 131A of the stator coil 131. Thereby the alternator 117 outputs three-phase alternating-current power to the output lines L10, L11 and L12. Here, the output lines L10, L11 and L12 correspond to the U-phase, V-phase and W-phase, respectively.

The regulator 61 has a three-phase full-wave rectification bridged circuit and a chopper circuit. After subjecting the three-phase alternating-current power generated by the alternator 117 to full-wave rectification, the regulator 61 regulates the voltage by a chopping operation and outputs the three-phase alternating-current power to the output line L20. The output electric power is smoothed by the condenser 63, converted to a direct-current power of a prescribed voltage, and thereafter supplied as the electric power for operation to the tilt angle sensor 120, the ECU 100, the injector 31, the ignition coil (igniter) 64 and the fuel pump 50 via the connection lines L21 to L25, respectively.

The aforementioned tilt angle sensor 120 is connected to the output line L20 of the regulator 61 via the connection line L21 and directly to the ECU 100 via a line L30. The ECU 100 is connected to the sensors including a negative-pressure sensor 41, a throttle sensor 42, an inlet temperature sensor 43, an engine coolant water temperature sensor 44, an engine revolution sensor (crank angle sensor) 45 and others. The ECU 100 supplies the electric power supplied via the output lines L20 and L22 to the sensors 41 to 45 and 120 and activates the sensors 41 to 45 and 120. Further, the ECU 100 is connected to the injector 31 and the ignition coil 64 via signal lines (control lines) L31 and L32. The ECU 100 determines the injected fuel amount and the timing of igniting the engine 13 on the basis of information obtained from the sensors 41 to 45, outputs prescribed control signals via the signal lines L31 and L32, and thus carries out the fuel injection control of the injector 31 and the ignition control of the ignition coil 64.

The fuel injection pump 50 is operatively connected to the output line L20 of the regulator 61 via the output line L25. Hence, the fuel injection pump 50 is continuously operated by the generated electric power as long as the alternator 117 continues to generate electric power and the operation stops when the alternator 117 stops generating electric power.

The motorcycle described herein is not equipped with a battery (electric accumulator) and is configured as a so-called battery-less vehicle. In this case, the motorcycle is equipped with a mechanical type kick starter (not shown in the figures). At the start of the engine 13, the engine 13 is started by kicking down a kick pedal attached to the crank case and thus applying torque to the crank shaft 21. When the engine 13 starts and thereby the alternator 117 generates electric power, the electric power for operation is supplied to the ECU 100, the tilt angle sensor 120, the ignition coil 64, the injector 31, the fuel pump 50 and others and they are ready to be operated. In this configuration, after the start of the engine, under the control of the ECU 100, the fuel injection control and the ignition control are carried out and the tilt angle of the vehicle body is detected by the tilt angle sensor 120.

When the vehicle body tilts to a large extent during the operation of the engine, and the tilt angle sensor 120 detects that the tilt angle of the vehicle body meets or exceeds a prescribed or predetermined tilt angle, the tilt angle signal SK is output to the ECU 100 via the signal line L30. The ECU 100, upon receiving the tilt angle signal SK, sets the signal lines L31 and L32 to a state of high impedance and stops the operations of the injector 31 and the ignition coil 64. When the operation of the injector 31 stops, the fuel supply to the intake path 27A of the cylinder head 18 is cut off and, when the operation of the ignition coil 64 stops, the supply of the voltage for ignition to the spark plug 118 is cut off. The power of the crank shaft 21 is thereby cut off, and hence the engine 13 stops operation.

In the present embodiment, the tilt angle sensor 120 is directly connected to the ECU 100 via the signal line L30, and the ECU 100 stops the operations of the injector 31 and the ignition coil 64 (engine drive section). This is quite different than a conventional configuration, since a starter kill relay to cut off the electric power supply to the engine drive section is not required by the inventive arrangement, and thus the number of parts can be reduced to that extent. Hence, it becomes possible to efficiently install various electric parts in the available space of an existing layout of a compact vehicle such as an off-road vehicle or the like.

Further, by the above configuration, when the operations of the injector 31 and the ignition coil 64 stop, the fuel supply to the engine 13 is cut off and the engine 13 stops in a short period of time. When the engine 13 stops, the electric power generation of the alternator 117 stops, the electric power supply to the fuel pump 50 via the output lines L20 and L25 is cut off, and the operation of the fuel pump 50 stops. Thereby, it becomes possible to cut off the fuel supply to the injector 31 and thus to stop the engine 13 more reliably.

By the present embodiment, since the fuel pump 50 is operatively connected to the output line L20 of the regulator 61, when the ECU 100 stops the operations of the injector 31 and the ignition coil 64 and thus stops the engine 13, the electric power supply for operation to the fuel pump 50 is cut off and the fuel pump 50 stops more reliably.

Therefore, a fuel pump relay, to cut off the electric power supply to the fuel pump, which has heretofore been required is longer required and, in comparison with a conventional configuration requiring plural relay switches (starter kill relay and fuel pump relay), it is possible to reduce the space for the installation of electric parts and to effectively use the existing space of a vehicle.

An embodiment of an engine controller according to the present invention has been explained above. However, the present invention is not limited to the embodiment and various modifications in design can be applied within the scope of the present invention. For example, though the above explanations have been done on the basis of the application of the present invention to a battery-less motorcycle, the present invention may be applied to a vehicle with a battery.

What is claimed is:

1. An engine control apparatus for a vehicle engine supported by a vehicle body in a vehicle of a type adapted to be used for off-road traveling and having a vehicle body cover, said engine control apparatus comprising:
   an engine drive section to drive the engine,
   a control section to control said engine drive section, and
   a tilt angle sensor operatively connected to said control section, the tilt angle sensor being operable to detect a tilt angle of said vehicle body and to transmit a tilt angle signal corresponding to the detected tilt angle to the control section;

wherein said control section is operable to stop driving said engine drive section when said control section receives a tilt angle signal having a value greater than or equal to a predetermined value from said tilt angle sensor;

wherein the vehicle body comprises a pair of main frames which are disposed to the upper left and the upper right of the engine, respectively, and the engine is supported beneath said main frames at a central portion of the vehicle body between front and rear wheels of the vehicle;

wherein the engine comprises a cylinder head, a throttle body, and a fuel injector, and wherein the cylinder head, the throttle body, the fuel injector, the control section and the tilt angle sensor are disposed adjacent to each other directly beneath a central portion of the vehicle body cover.

2. The engine control apparatus according to claim 1, wherein said engine drive section comprises at least one of a fuel injector and an ignition coil.

3. The engine control apparatus according to claim 1, wherein:
said engine controller is provided with an electric power supply; and
an output line of said electric power supply is operatively connected to said engine drive section, said control section and said tilt angle sensor.

4. The engine control apparatus according to claim 3, wherein said electric power supply comprises an electric alternator to generate electric power by the rotation of said engine.

5. The engine control apparatus according to claim 3, wherein said engine drive section comprises at least one of a fuel injector and an ignition coil.

6. The engine control apparatus according to claim 5, wherein said engine controller is provided with a fuel pump to feed fuel to said fuel injector; and said fuel pump is operatively connected to said output line of said electric power supply.

7. A method of controlling an engine of a vehicle using a controller, the vehicle of a type adapted to be used for off-road traveling and comprising a vehicle body having a vehicle body cover, the engine comprising
an engine housing,
a crank shaft rotatably supported on the engine housing,
a fuel injector for injecting fuel into the engine,
a throttle body;
a cylinder head;
an ignition coil,
a controller for controlling operation of the engine, the controller comprising a tilt angle sensor incorporated therein,
an alternator connected to an end of the crank shaft, the alternator generating alternating current power via the crankshaft of the engine, the alternator in direct electrical connection with and supplying power to the tilt angle sensor, the fuel injector, the ignition coil, and the controller,
wherein the vehicle body comprises a pair of main frames which are disposed to the upper left and the upper right of the engine, respectively, and the engine is supported beneath said main frames at a central portion of the vehicle body between front and rear wheels of the vehicle;

wherein the engine comprises a cylinder head, a throttle body, and a fuel injector, and wherein the cylinder head, the throttle body, the fuel injector, the control section and the tilt angle sensor are disposed adjacent to each other directly beneath a central portion of the vehicle body cover;

said method of controlling the engine comprising the steps of:
monitoring a tilt angle of the vehicle body as sensed by the tilt angle sensor,
determining if a sensed tilt angle is greater than a predetermined tilt angle, and
temporarily interrupting operation of the fuel injector or the ignition coil so as to prevent fuel from being injected to the engine or prevent an ignition within the engine, thereby stopping operation of the engine, when the sensed tilt angle is greater than the predetermined tilt angle.

8. The method of controlling an engine of claim 7, wherein the engine further comprises a fuel pump for supplying fuel to the fuel injectors, the fuel pump being electrically connected to the alternator so as to be supplied with power from the alternator, and wherein when the operation of the engine is interrupted, the electric power generation by the alternator stops and consequently the electric power supply to the fuel pump is stopped, thereby stopping fuel supply to the fuel injector.

9. The method of controlling an engine of claim 7, wherein the vehicle comprises a battery-less motorcycle, and all electrical power required for operation by the motorcycle is generated by the alternator.

10. In a motorcycle of the type adapted to be used for off-road traveling and having a vehicle body comprising a frame, a front wheel and a rear wheel respectively attached to the frame, a vehicle body cover attached to the vehicle body, and an engine attached to the frame and comprising a cylinder head, a throttle body, an ignition coil and a fuel injector,
the improvement comprising a compact arrangement of components including an electronic control unit (ECU) comprising a case, a tilt angle sensor disposed in the case of the ECU, and a control section for controlling operation of the engine, wherein said ECU is operatively attached to said throttle body, the tilt angle sensor being operable to detect a tilt angle of said vehicle body and to transmit a tilt angle signal corresponding to the detected tilt angle to the control section;

wherein said ECU is operable to interrupt engine operation when said ECU receives a tilt angle signal having a value greater than or equal to a predetermined value from said tilt angle sensor;

wherein the vehicle body comprises a pair of main frames which are disposed to the upper left and the upper right of the engine, respectively, and the engine is supported beneath said main frames at a central portion of the vehicle body between the front and rear wheels of the motorcycle;

and wherein the cylinder head, the throttle body, the fuel injector, the control section and the tilt angle sensor are disposed adjacent to each other directly beneath a central portion of the vehicle body cover.

11. The motorcycle according to claim 10, wherein:
said engine controller is provided with an electric power supply; and
an output line of said electric power supply is operatively connected to said electronic coil, said control section and said tilt angle sensor.

12. The motorcycle according to claim 11, wherein said electric power supply comprises an electric alternator to generate electric power by the rotation of said engine.

13. The motorcycle according to claim 11, wherein said engine is provided with a fuel pump to feed fuel to said fuel injector; and said fuel pump is operatively connected to said output line of said electric power supply.

* * * * *